United States Patent
Mann

(10) Patent No.: US 7,213,851 B2
(45) Date of Patent: May 8, 2007

(54) CANNING RACK UTENSIL

(75) Inventor: Jesse A Mann, 1361 Holiday La., Portage, MI (US) 49024

(73) Assignee: Jesse A Mann, Portage, MI (US)

( * ) Notice: Subject to any disclaimer, the term of this patent is extended or adjusted under 35 U.S.C. 154(b) by 679 days.

(21) Appl. No.: 10/401,292

(22) Filed: Mar. 27, 2003

(65) Prior Publication Data
US 2004/0187705 A1 Sep. 30, 2004

(51) Int. Cl.
A47J 45/10 (2006.01)
(52) U.S. Cl. .................. 294/26; 294/27.1; 294/131
(58) Field of Classification Search .............. 294/12, 294/26, 27.1, 131, 170; 16/425
See application file for complete search history.

(56) References Cited

U.S. PATENT DOCUMENTS

| 1,334,510 | A | * | 3/1920 | Waterbury | 294/26 |
| 2,156,214 | A | * | 4/1939 | Woodman | 126/275 R |
| 4,061,387 | A | * | 12/1977 | Lindbergh | 294/26 |
| 4,258,948 | A | * | 3/1981 | Hoffmann | 294/29 |
| 4,463,977 | A | * | 8/1984 | Wyatt | 294/26 |
| 4,482,181 | A | * | 11/1984 | Shepherd | 294/12 |
| 4,955,650 | A | * | 9/1990 | Davey | 294/26 |
| 6,598,915 | B2 | * | 7/2003 | Ngo et al. | 294/27.1 |

* cited by examiner

*Primary Examiner*—Dean J. Kramer
(74) *Attorney, Agent, or Firm*—Harness, Dickey & Pierce, P.L.C.

(57) ABSTRACT

A tool for use with a canning pot and a canning rack includes a pair of spaced-apart legs joined at a handle adapted for manipulation by a user. The spaced-apart legs terminate at a hook, which is adapted to grasp the rack and operable to place and remove the rack in the canning pot. A canning system includes a canning pot, a canning rack, and a rack lifter including a pair of tools, each including a pair of legs joined by a handle and terminating in a hook operable to grasp the rack. A method for canning food includes heating a first quantity of water in a canning pot, placing at least one jar in a canning rack, and placing the canning rack including the at least one jar in a first quantity of water using a pair of tools for selectively grasping the canning rack.

3 Claims, 2 Drawing Sheets

CANNING RACK UTENSIL

FIELD OF THE INVENTION

The present invention relates to canning foods and, more particularly, a tool and system for manipulating a canning rack.

BACKGROUND OF THE INVENTION

Canning is a safe and economical way to preserve food quality at home. Canning home-grown food may save you significant money when compared to buying commercially canned food. Further, canning favorite and special products to be enjoyed by family and friends is often a fulfilling experience and a source of pride for many people. Moreover, if vegetables are handled properly and canned promptly after harvest, they can be more nutritious than fresh produce sold in local stores.

Because of the high percentage of water in most fresh foods, they are very perishable and spoil or lose quality because of the growth of undesirable microorganisms, such as bacteria, molds, and yeast; the activity of food enzymes; reactions with oxygen; and moisture loss. Microorganisms live and multiply quickly on the surfaces of fresh food and on the inside of bruised, insect-damaged, and diseased food.

Proper canning practices, however, can mitigate the perishable qualities of food. Proper canning practices include carefully selecting and washing fresh food; peeling some fresh foods; hot packing many foods; adding acids (lemon juice or vinegar) to some foods; using acceptable jars and self-sealing lids; and processing jars in a boiling-water or pressure canner for the correct period of time. Collectively, these practices remove oxygen; destroy enzymes; prevent the growth of undesirable bacteria, yeasts, and molds; and help form a high vacuum in jars. Good vacuums form tight seals, which keep liquid in and air and microorganisms out.

Many canning practices are concerned with preventing the growth of the bacterium *Clostridium botulinum*, which may cause botulism, a deadly form of food poisoning. *Botulinum* spores are found on most fresh food surfaces but, because they grow only in the absence of air, are harmless in fresh foods. Thus, most canning processing times ensure destruction of the largest expected number of heat-resistant microorganisms in canned foods, including botulinum spores. Properly sterilized canned food will be free of spoilage if lids are sealed and jars are stored below 95° F.

Further, whether food should be processed in a pressure canner or boiling-water canner to control *botulinum* bacteria depends on the acidity of the food. Acidity may be natural, as in most fruits, or added, as in pickled food. Low-acid canned foods are not acidic enough to prevent the growth of these bacteria, while acid foods contain enough acid to block their growth, or destroy them more rapidly when heated. The term "pH" is a measure of acidity; the lower its value, the more acid the food. The acidity level in foods can be increased by adding lemon juice, citric acid, or vinegar.

Low-acid foods have pH values higher than 4.6. They include red meats, seafood, poultry, milk, and all fresh vegetables except most tomatoes. Most mixtures of low-acid and acid foods also have pH values above 4.6 unless their recipes include enough lemon juice, citric acid, or vinegar to make them acid foods. Acid foods have a pH of 4.6 or lower. They include fruits, pickles, sauerkraut, jams, jellies, marmalades, and fruit butters.

Botulinum spores are very hard to destroy at boiling-water temperature; the higher the canner temperature, the more easily they are destroyed. Therefore, all low-acid foods should be sterilized at temperatures of 240° to 250° F., attainable with pressure canners operated at 10 to 15 pounds per square inch of pressure as measured by gauge (PSIG). At temperatures of 240° to 250° F., the time needed to destroy bacteria in low-acid canned food ranges from 20 to 100 minutes. The exact time depends on the kind of food being canned, the way it is packed into jars, and the size of the jars. The time needed to safely process low-acid foods in a boiling-water canner ranges from 7 to 11 hours; the time needed to process acid foods in boiling water varies from 5 to 85 minutes.

Accordingly, it is very important in the art of home canning to destroy undesirable bacteria such as *Clostridium botulinum* by processing the cans in a pressure canner or boiling-water canner. But using such high-pressure and high-heat devices presents other safety concerns to users, such as the handling of equipment used in the canning process. One such concern is with the handling of canning racks, which are used to submerse the jars in two main types of canners for heat processing home-canned foods; boiling-water canners and pressure canners.

For example, when handling jars in a conventional canning process, jar lifters are used to individually place and remove jars in a rack of the canner. The rack positions the one or more jars in the canner such that water substantially surrounds each jar. While the rack is removable from the canner, the jar lifters are used to place the jars in the rack and remove the jars from the rack because, typically, the rack is at least partially submersed in hot water. Thus, to avoid injury to the user from the hot water, the jar lifters provide a safe way to move the jars to and from the hot water. This process suffers from the inefficiency that only a single jar may be removed at one time, despite the fact that the rack itself is removable from the canner.

SUMMARY OF THE INVENTION

A tool for use with a canning apparatus includes a pair of spaced-apart legs joined at a handle adapted for manipulation by a user. The legs terminate at a hook, which is adapted to grasp a canning rack and operable to place and remove the canning rack in a canning pot. The canning system according to the invention includes a canner having a base surrounded by walls, which define an opening opposite the base. The walls and base define a void selectively accommodating a rack, which generally includes walls surrounding a base. The rack walls and rack base include openings and define a mounting space for holding at least one canning jar. A rack lifter includes a pair of tools, each of which includes a pair of legs joined by a handle. The handle is adapted to facilitate manipulation when tooled by a user. The legs terminate in a hook operable to grasp the rack. The canning system allows the rack to be selectively placed in the void of the canning pot through placement by the user manipulating the tools. The rack is removable from the void of the canner by the user manipulating the tools, whereby at least one jar can be safely placed and removed from the canner.

A method according to the invention includes heating a first quantity of water in a canning pot, placing at least one jar in a canning rack, and placing the canning rack including at least one jar in the first quantity of water using a pair of tools for selectively grasping the canning rack. The tools include a pair of legs joined by a user-manipulatable handle at a distal end and terminate in a hook at each terminal end. The method further includes the step of adding a second quantity of water to the canning pot to cover at least one jar placed in the rack in the canning pot. An additional step may include removing the canning rack from the canning pot by grasping the rack with the tools.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
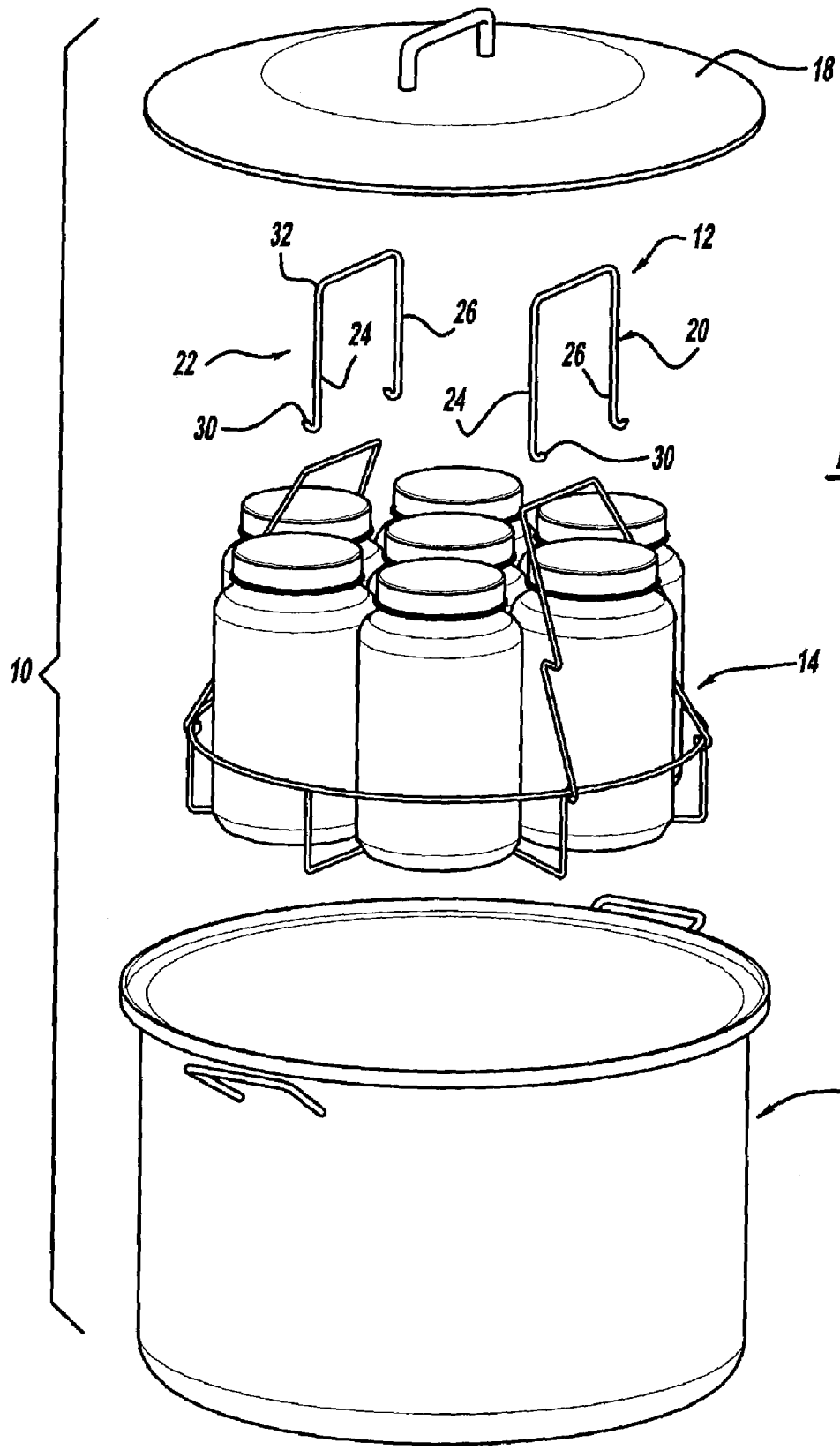
FIG. 1 is an exploded perspective view of a canning apparatus according to the invention.
Figure 2:
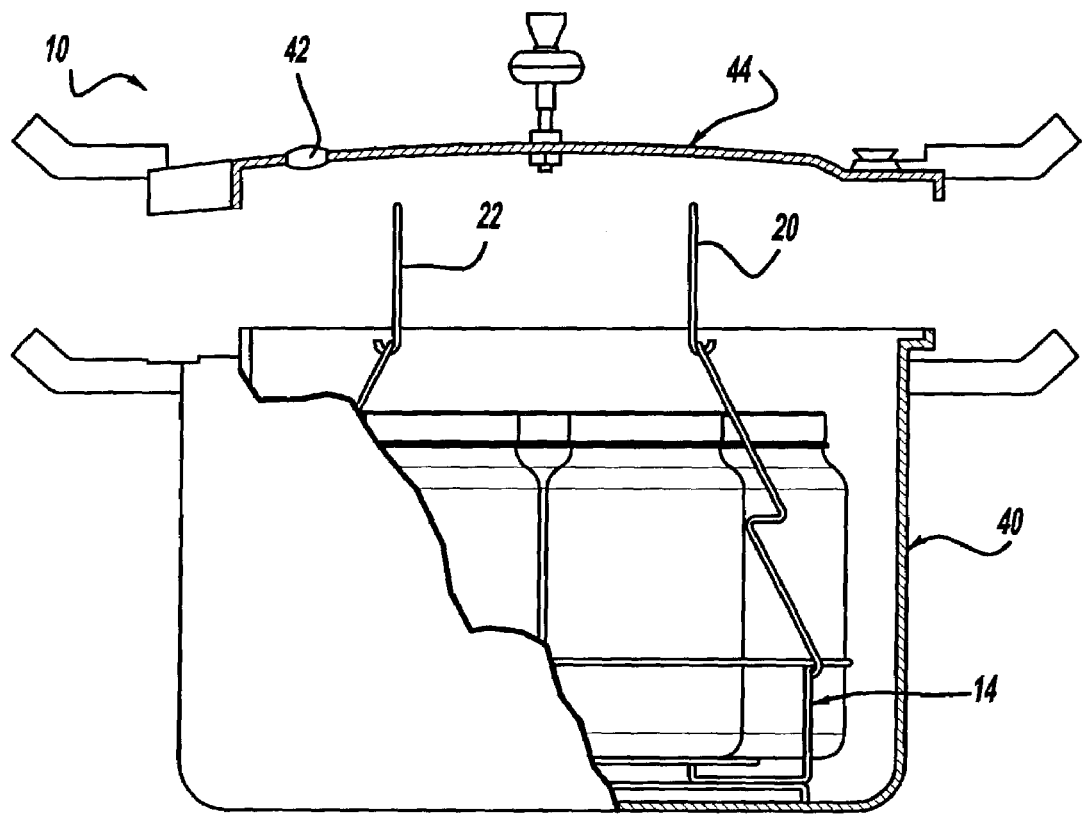
FIG. 2 is a partial sectional side view of a canning apparatus according to a variation of the invention.
Figure 3:
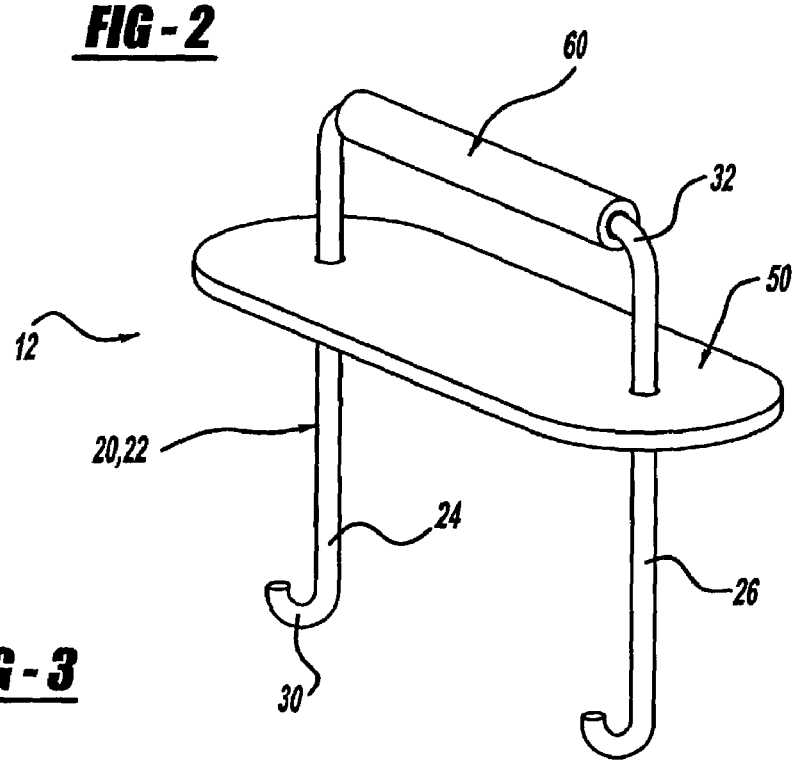
FIG. 3 is a perspective view of a rack lifter according to one embodiment of the invention.

The following description of the preferred embodiment(s) is merely exemplary in nature and is in no way intended to limit the invention, its application, or uses.

Typical boiling-water canning pots and pressure canning pots are designed to hold seven quart jars or eight to nine pint jars. Small pressure canning pots hold as few as four quart jars and some large pressure canning pots hold as many as eighteen pint jars. As explained above, while low-acid foods must be processed in a pressure canning pot to be free of botulism risks, pressure canning pots may also be used for processing acid foods. Boiling-water canning pots, however, are typically recommended for this purpose because they are faster. With either type of canning pot, high temperature water is required.

Boiling-water canning pots are made of aluminum or porcelain-covered steel and have removable perforated racks and fitted lids. The canning pot must be deep enough so that at least one inch of briskly boiling water will be over the tops of the jars during processing. To use a boiling-water canning pot, the canning pot is first filled halfway with water, which is preheated to 140° F. for raw-packed foods and 180° F. for hot-packed foods. Next, the filled jars, fitted with lids, are loaded into the canning rack, which is lowered into the water. More boiling water is added as necessary so that the water level is at least one inch above the jar tops. High heat is applied until the water boils vigorously. The canning pot is covered with its lid and the heat setting is lowered to maintain a gentle boil for the amount of time required to safely process the food. During this period, more boiling water is added as necessary to keep the water level above the jars. After the required amount of time, the heat is turned off and the canning lid is removed. At this point, the jars are to be removed from the canning pot and placed on a towel, leaving at least one inch of spaces between the jars for cooling.

The canning system and method according to the invention facilitates removing the jars from the canning pot in a safe and efficient manner. Generally, canning apparatus 10 includes a rack lifter 12, canning rack 14, canning pot 16, and canning lid 18. The rack lifter 12, as shown in the drawings, includes a pair of generally U-shaped tools 20, 22, each having a pair of generally J-shaped legs 24, 26. Each J-shaped leg 24, 26 includes a terminal hook-like portion 30 adapted for grasping the canning rack 14. A bridge portion 32 connects each J-shaped leg 24, 26. The bridge portion 32 functions as a handle and allows a user to operate the tool 20, 22 and lift the canning rack 14 from the canning pot 16 once the hook-like portion 30 has grasped the canning rack 14.

Pressure canning pots typically operate at a gauge pressure of 10.5 pounds to provide an internal temperature of approximately 240° F. A pressure canning pot can be safely and effectively used by putting two to three inches of hot water in the canning pot, and placing filled, lidded jars on the canning rack and lowering the rack into the canning pot. Preferably, the tools 20, 22 as described above are used to safely lower the canning rack 14 into a pressure canning pot 40. Next, the canning pot 40 is vented by leaving a vent port 42 in a pressure canning lid 44 uncovered or manually opening the petcock, depending on the type of pressure canning pot. The canning pot 40 is set to the highest heat setting until steam flows from the vent port 42. While maintaining the high-heat setting, steam should be exhausted for approximately ten minutes, at which point the vent port 42 is closed to pressurize the canning pot 40. When the pressure reading on a pressure gauge indicates that the recommended pressure has been reached, the process can be timed. The heat should be regulated in the canning pot 40 to maintain a steady pressure at or slightly above the correct gauge pressure. Quick and large pressure variations during processing may cause unnecessary liquid losses from the jars. After the required amount of time, the heat is turned off, at which point the canning pot 40 depressurizes, which typically requires about thirty to forty-five minutes. Once depressurized, the vent port 42 may be opened. After approximately two minutes, the canning lid 44 may be removed to vent the remaining steam. The jars are then removed by lifting the canning rack 14 from the canning pot 40 using the rack lifter 12, at which point they may be cooled on a towel or cooling rack.

It is this cooling process, required for effective canning, that presents the risk of burns from the hot steaming water in the canning pot. The rack lifter 12 according to the invention effectively reduces this risk by providing a safe method for removing the loaded rack lifter 14 from the canning pot 16, 40. Further, this method is more efficient than the known jar lifter, which requires removing one jar at a time from the canning pot for cooling purposes.

As generally described above, a tool 20, 22 for use with a canning pot 16, 40 and a canning rack 14 includes a pair of spaced-apart legs 24, 26 joined at a handle, which is adapted for manipulation by a user. Each of the spaced-apart legs 24, 26 terminate at a hook-like portion 30, which is adapted to grasp the canning rack 14 and operable to place and remove the canning rack 14 in the canning pot 16, 40.

Similarly, a canning system according to the invention includes a canning pot 16, 40 having a pot base surrounded by pot walls. The pot walls define an opening opposite the pot base, the pot walls and pot base defining a void. The canning system further includes a canning rack 14 including rack walls surrounding a rack base. The rack walls and rack base include openings and define a mounting space adapted to hold at least one jar. The canning system further includes a rack lifter 12 including a pair of tools 20, 22. Each tool includes a pair of legs 24, 26 joined by a handle, which is adapted to facilitate manipulation of the tools 20, 22 by a user. Each of the legs 20, 22 terminate in a hook-like portion 30 operable to grasp the canning rack 14. The canning system allows a user to selectively place the canning rack 14 in the void of the canning pot 16, 40 through placement by the rack lifter 12. The canning rack 14 is also selectively removable from the void of the canning pot 16, 40 by the rack lifter 12. In this manner, at least one jar can be safely placed and removed from the canning pot 16, 40.

The tooling system as described above may further include a guard 50 disposed between the hooks and the handle. The guard 50 is operable to prevent inadvertent exposure of hot water to a user's hand when manipulating the tool 20, 22 via the handle. As shown, the guard 50 is a generally planar device disposed intermediate the hook-like portions 30 and the bridge portion 32 and orientated parallel to the bridge portion 32. Further, the bridge portion 32 includes the handle, which may include a grip 60 to facilitate manipulation of the tool 20, 22 by a user. As shown, the grip 60 is a generally tubular structure disposed about the handle.

A method for canning of food according to the invention generally includes heating a first quantity of water in a canning pot 16, 40, placing at least one jar in a canning rack 14, and placing the canning rack 14 including the at least one jar in the first quantity of water using a pair of tools 20, 22 for selectively grasping the canning rack 14. According to the method, each of the tools 20, 22 includes a pair of legs 24, 26 joined by a user-manipulatable handle at a distal end and terminate in a hook-like portion 30 at each terminal end. The method may further include the step of adding a second quantity of water to the canning pot 16, 40 to cover the at least one jar placed in the canning rack 14 in the canning pot 16, 40. Further, the method may include removing the canning rack 14 from the canning pot 16, 40 by grasping the canning rack 14 with the tools 20, 22.

The following terms have been used in the specification and are given the following definitions:

Acid foods: Foods which contain enough acid to result in a pH of 4.6 or lower. Includes all fruits except figs, most tomatoes, fermented and pickled vegetables, relishes, jams, jellies, and marmalades. Acid foods may be processed in boiling water.

Bacteria: A large group of one-celled microorganisms widely distributed in nature. See microorganism.

Boiling-water canner: A large standard-sized lidded kettle with a jar rack, designed for heat-processing jars in boiling water.

Botulism: An illness caused by eating toxin produced by growth of *Clostridium botulinum* bacteria in moist, low-acid food, containing less than two percent oxygen, and stored between 40° and 120° F. Proper heat processing destroys this bacterium in canned food. Freezer temperatures inhibit its growth in frozen food. Low moisture controls its growth in dried food. High oxygen controls its growth in fresh foods.

Canning: A method of preserving food in air-tight vacuum-sealed containers and heat processing sufficiently to enable storing the food at normal home temperatures.

Heat processing: Treatment of jars with sufficient heat to enable storing food at normal home temperatures.

Hot pack: Heating of raw food in boiling water or steam and filling it hot into jars.

Low-acid foods: Foods which contain very little acid and have a pH above 4.6. The acidity in these foods is insufficient to prevent the growth of the bacterium *Clostridium botulinum*. Vegetables, some tomatoes, figs, all meats, fish, seafoods, and some dairy foods are low acid. To control all risks of botulism, jars of these foods must be heat processed in a pressure canner or acidified to a pH of 4.6 or lower before processing in boiling water.

Microorganisms: Independent organisms of microscopic size, including bacteria, yeast, and mold. When alive in a suitable environment, they grow rapidly and may divide or reproduce every 10 to 30 minutes. Therefore, they reach high populations very quickly. Undesirable microorganisms cause disease and food spoilage. Microorganisms are sometimes intentionally added to ferment foods, make antibiotics, and for other reasons.

pH: A measure of acidity or alkalinity. Values range from 0 to 14. A food is neutral when its pH is 7.0: lower values are increasingly more acidic; higher values are increasingly more alkaline.

Pressure canner: A specifically designed metal kettle with a lockable lid used for heat processing low-acid food. These canners have jar racks, systems for exhausting air, and a way to measure or control pressure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A canning system comprising:
    a canning pot having a pot base surrounded by pot walls, said pot walls defining an opening opposite said pot base, said pot walls and pot base defining a void;
    a rack including rack walls surrounding a rack base, said rack walls and rack base including openings and defining a mounting space adapted to hold at least one jar; and
    a rack lifter including a pair of tools, each tool including a pair of legs joined by a handle and including a longitudinal axis, said handle adapted to facilitate manipulation of the tool by a user, each of said legs terminating in a hook operable to grasp said rack, and a generally planar guard disposed between said hooks and said handle and extending substantially perpendicular to said longitudinal axis of said legs, said guard operable to prevent inadvertent exposure of water to the user's hand; and
    wherein said rack is selectively placed in said void of said canning pot through placement by said rack lifter, and said rack is selectively removable from said void of said canning pot by said rack lifter, whereby said at least one jar can be placed and removed from said canning pot.

2. The canning system of claim 1, wherein said handle includes a grip.

3. The canning system of claim 1, wherein said guard is oriented parallel to the handle.

* * * * *